M. D. PRATT.
REINFORCED CONCRETE CONDUIT.
APPLICATION FILED MAY 14, 1910.
1,001,682.
Patented Aug. 29, 1911.
3 SHEETS—SHEET 1.
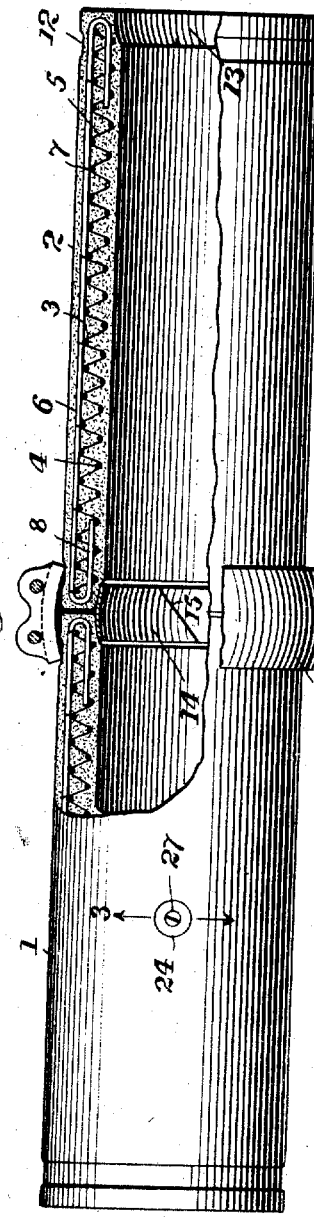
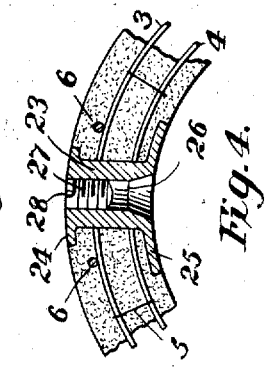
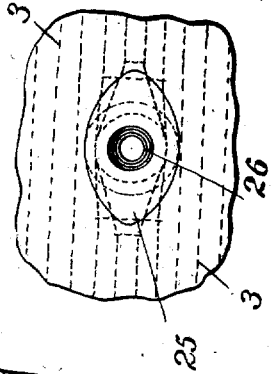
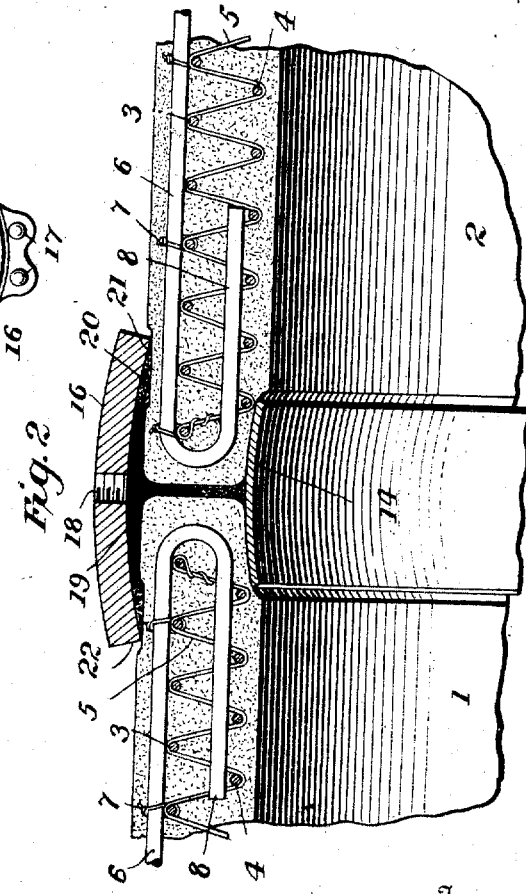
Witnesses
Inventor
Mason D. Pratt
By
Foster, Freeman, Watson & Caig
Attorneys M. D. PRATT.
REINFORCED CONCRETE CONDUIT.
APPLICATION FILED MAY 14, 1910.
1,001,682.
Patented Aug. 29, 1911.
3 SHEETS—SHEET 2.
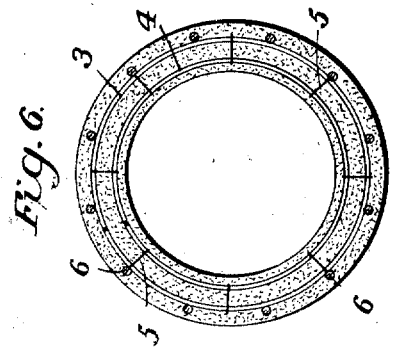
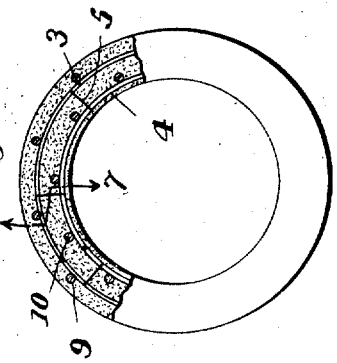
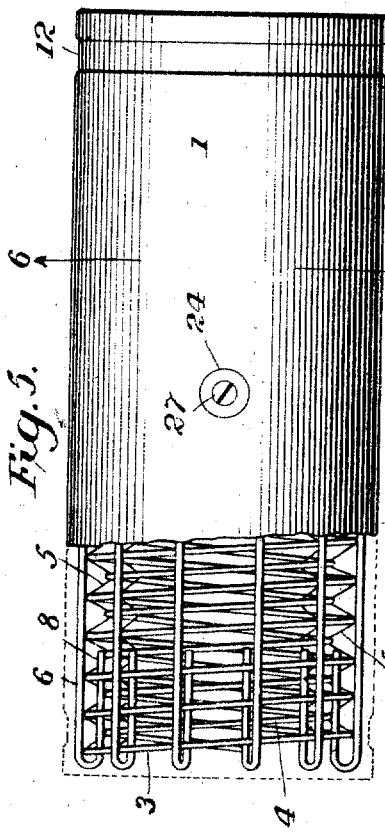
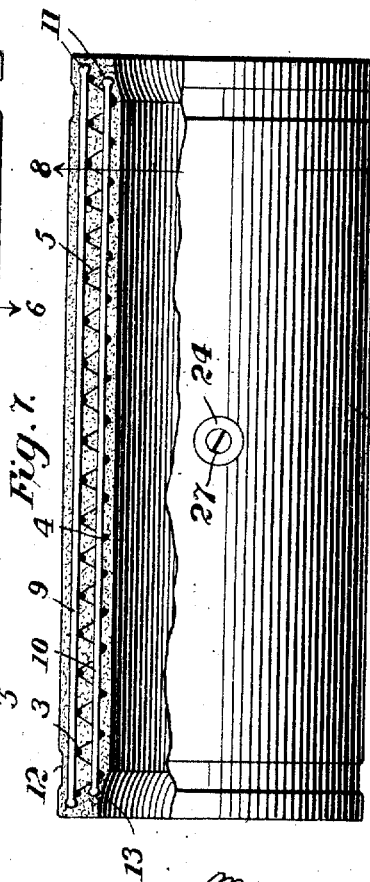
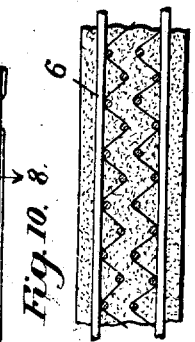
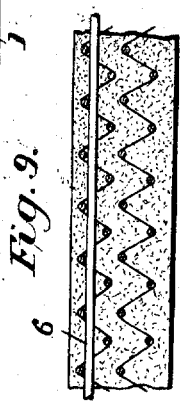
Witnesses
J. G. Hinkel
Cyril Brown.
Inventor
Mason D. Pratt
By
Fastin, Freeman, Watson & Coit
Attorneys

M. D. PRATT.
REINFORCED CONCRETE CONDUIT.
APPLICATION FILED MAY 14, 1910.

1,001,682.

Patented Aug. 29, 1911
3 SHEETS—SHEET 3.

UNITED STATES PATENT OFFICE.

MASON DELANO PRATT, OF HARRISBURG, PENNSYLVANIA.

REINFORCED-CONCRETE CONDUIT.

1,001,682.

Specification of Letters Patent.   Patented Aug. 29, 1911.

Application filed May 14, 1910.   Serial No. 561,351.

*To all whom it may concern:*

Be it known that I, MASON DELANO PRATT, a citizen of the United States, and resident of Harrisburg, county of Dauphin, State of Pennsylvania, have invented certain new and useful Improvements in Reinforced-Concrete Conduits, of which the following is a specification.

This invention relates particularly to pipes or conduits formed of concrete or cement mortar suitable for carrying liquids or gases under considerable pressure. One of its objects is to so reinforce conduits made of concrete or cement mortar as to give them sufficient strength to stand the high pressure without the necessity of making them materially heavier than cast-iron of the same internal diameter heretofore used for the purpose. A reinforced concrete conduit having the strength to withstand internal and external forces to an extent equal with the commonly used cast-iron pipe, has the further valuable property of being non-corrodible, and will resist electrolysis. It will therefore last indefinitely, and furthermore, the absence of corrosion on the interior insures the conduit always having its full carrying capacity, which is not the case with cast-iron.

Other objects are to produce conduits which will be gas and water-tight both in the body portion and at the joints, even when the sections of which they are composed contract or expand or may be moved from their original alinement after being placed in position by the settling of surrounding earth, and to provide means for connecting branch pipes or corporation taps to the conduit.

With these objects in view the invention consists in the novel features of construction which will be apparent from the following description taken in connection with the accompanying drawings.

Figure 12:
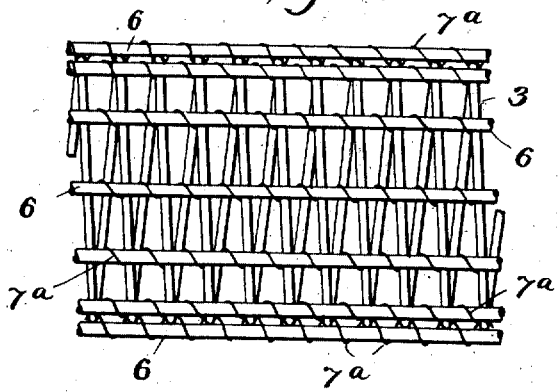
Figure 15:
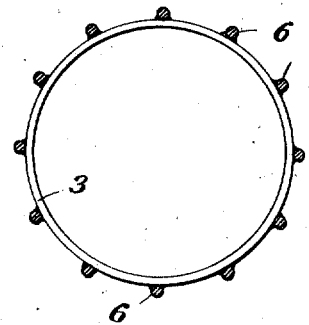
Figure 13:
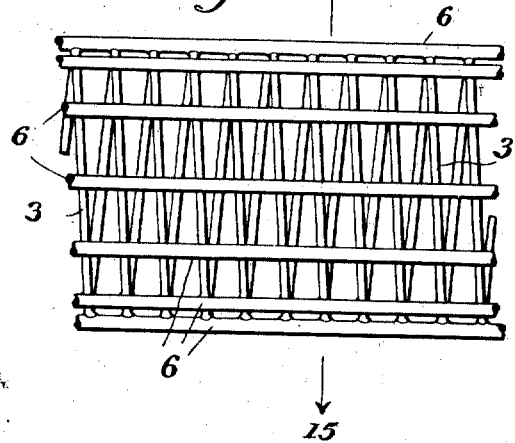
Figure 14:
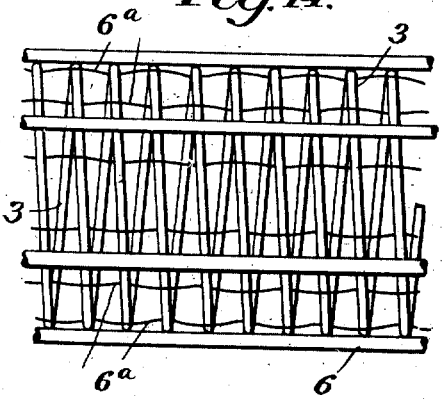

In the drawings,—Figure 1 is a plan view, partly in section of a conduit embodying my invention; Fig. 2 is an enlarged sectional view through my improved joint between two adjacent sections; Fig. 3 is an enlarged detail sectional view taken on the line 3—3 of Fig. 1; Fig. 4 is a bottom plan view of the outlet tap shown in Fig. 3; Fig. 5 is a plan view of a section of the conduit having the concrete removed at one end to show the reinforcing steel cage; Fig. 6 is a cross section on the line 6—6 of Fig. 5; Fig. 7 is a longitudinal view partly in section on the line 7—7 of Fig. 8, showing a modified form of reinforcing cage; Fig. 8 is a cross section on the line 8—8 of Fig. 7; Fig. 9 is an enlarged detail view of a modified form of reinforcing means; Fig. 10 is a similar view of another form embodying two reinforcing cages; Fig. 11 shows a modification of the means for anchoring the strengthening rods of the cage in the concrete; Figs. 12, 13 and 14 illustrate three additional methods of assembling and connecting the members forming the cage; Fig. 15 is a section on the line 15 of Fig. 13.

As shown in these drawings, I make up my conduit of similar sections which are connected together by my improved joint. In Fig. 1 I have shown two of such sections 1 and 2, the main body of which is composed of concrete, cement mortar or similar material, and each section has embedded within it a reinforcing cage which is preferably made of steel rods or wires, and which is of peculiar construction giving both strength and lightness. My steel cage is made up, in the forms shown in Figs. 1 and 2, of an outer spiral 3 of steel wire, and a similar inner spiral 4 which is separated from the outer spiral. The coils or turns of the two spirals are parallel, but, as shown in the drawings, the two spirals are brought into such relation that the turns will have a staggered relation to each other longitudinally of the pipe, so that a turn of the spiral 4 will be between two turns of the spiral 3. The two spirals are laced together by wires 5 which are preferably smaller than the wires of the spiral, and which are secured to the end turns of one spiral and pass alternately outside of the various turns of the two spirals in succession, the wire 5 being continuous from one end of the spiral cage to the other. These lacing wires are placed at intervals around the cage, as shown in Fig. 6, and serve to hold the two spirals in proper relation to each other. These lacing wires placed at regular intervals not only hold the two spirals in proper relation to each other, and to the wall of the pipe or conduit, but also serve to reinforce and materially strengthen the concrete wall in which they are embedded. In addition to the two spirals and lacing wires above mentioned, I make use of longitudinal rods secured to one of the spirals so as not only to hold the spirals in place, but to give added strength to the pipe in a longitudinal direction, and thus avoid the liability to breakage or damage in transportation or because of uneven settlement of the ground in which the conduit or pipe is laid. As shown in Figs. 1 and 2 the steel rods 6 are placed at regular intervals around the outer spiral 3 and are tied to that spiral at intervals by means of small wires 7, or they may be electrically welded, soldered or brazed thereto. The ends of these rods are preferably bent back between the two spirals with their ends 8 extending practically in contact with the turns of the spiral 4, thus serving to center the inner spiral with respect to the outer spiral. These rods may be larger and stronger than the wires of the spiral, and turning the end back as shown in Fig. 2, serves to materially strengthen the conduit sections at the ends where there is the most liability to breakage.

The cage above described being made up of steel wires will stand much higher stresses than would be possible with a cast-iron article of the same weight, and thus I am enabled to secure the same strength as a cast-iron pipe with the use of a much less weight of metal, and the mortar or concrete which it is necessary to add to make up the conduit does not raise the weight to that of a cast-iron pipe. It will be understood that the cage above described is placed in position, and the concrete is suitably molded around it so as to produce the conduit section in its completed form. These sections are then transported to the place of use and are secured together by a joint preferably made as hereinafter described.

In the form of cage shown in Fig. 12 the longitudinal rods 6 are connected to the spiral member by wires 7ª which are wound spirally around the rods and the coils of the spiral 3. In Figs. 13 and 15 the longitudinal rods 6 are shown as electrically welded, brazed or soldered to the coils of the spiral 3. In Fig. 14 rods or wires 6ª, which are considerably lighter than the main rods 6, are interwoven with the coils of the spiral 3 after the manner of weaving baskets. This forms a rather rigid and strong construction with which a smaller number of longitudinal rods 6 may be used. The rod 6 shown in Fig. 14 may be electrically welded to the coils of the spiral or attached in any other suitable manner.

Instead of making the reinforced steel cage with the single series of longitudinal wires or rods 6 around the outer side of the outer spiral, I may make use of two sets of rods 9 and 10, as shown in Fig. 7, one being secured to the outer spiral and the other to the inner spiral. The ends of the rods, furthermore, instead of being turned back, as shown in Fig. 2, may be anchored in the concrete by an enlarged head 11, or I may use any of the so-called deformed or twisted bars commonly used in reinforced concrete construction, with or without having the ends bent. This construction may also be used with the single series of rods such as shown in Fig. 1, and those rods may be placed inside of instead of outside the spiral, as is illustrated in Fig. 11. Where desired, or where the walls of the conduit are very thick, it may be found advisable to use two or more cages to reinforce the walls, as shown in Figs. 9 and 10, and in this case each cage includes the two concentric spirals laced together, and one or more of the cages includes the longitudinal strengthening rods. It will be understood that various modifications may be made in the specific form of the cage without departing from the spirit of my invention. While I am aware that a spiral has been used to reinforce concrete construction, I believe the use of two spirals laced together constituting a reinforcing cage is new.

The sections of the conduit when they are molded or formed are provided near their ends on the outer side with depressions or grooves 12, and the inner surface at each end is expanded, as shown at 13, substantially on the arc of a circle. These grooves and expanded ends coöperate with inner and outer ring-like bands which I use in making up the joint between sections. As shown in Figs. 1 and 2, the inner ring-like metal band 14 is curved longitudinally of the conduit so as to fit the expanded portions 13 of the adjacent pipe sections which are placed end to end. This ring 14 is expansible and is preferably cut on a diagonal line 15, as shown in Fig. 1. An outer ring-like band 16 is placed around the joint between the two sections with its edges resting in the grooves 12. This band is made up of sections secured together by bolts or rivets 17 or by ordinary clamping means, and has a concave under surface, so that its outer edge alone will be in contact with the pipe when the sections are in position. The top section of the band 16 is provided with an opening 18 near its center, closed by a screw plug, the purpose of this opening being to permit asphalt, tar or other plastic water repellent material to be poured through the band into the space surrounding the ends of the concrete sections. In Fig. 2 this plastic water repellent material is shown at 19 both between the adjacent ends of the sections and above those ends beneath the plate, and the result of this is that if the sections are not placed in exact alinement the plastic material will nevertheless make a complete joint preventing leakage, and this will be true even if the pipes sag after they are placed in position. The spherical form of the plate 14 and the abutting inner surface of the pipe sections also permits this change in alinement without breaking the joint. Before the plastic material is poured into the joint a packing material 20, which may be of fibrous or cellular form, is placed beneath the edges 21, 22, and this material may also be placed in the bottom of the space between the ends of the two sections before the plastic material is poured into place. This makes practically a free ball and socket joint having the filling of waterproof material which prevents leakage. This material is asphalt, coal tar, or similar plastic material which may be brought into a fluid state so that it will run easily into position and will adhere to the ends of the pipe section. The fibrous or cellular packing 20, not only prevents the plastic material from escaping, but is compressible and hence permits some expansion or turning of the pipe sections on the joint without affecting the gas tight connection and without forcing the plastic material out beneath the band 16.

In order to use my conduit pipe to supply gas or liquid at various points, it is necessary to connect pipes to it, and to provide means by which the connection can be conveniently made I have devised such a connection, as shown in detail in Figs. 3 and 4, and in plan view in Figs. 1, 5 and 7. It consists of a metal casting 23, the body portion of which is preferably cylindrical, and the ends of which are provided with flanges 24 and 25. This casting is embedded in the body of the concrete passing through the wall of the conduit so that the flanges will be flush with the inner and outer walls, as clearly shown in Fig. 3. In order to prevent the turning of this casting in the pipe which would loosen it and cause leakage, I make one of the flanges longer in one direction than in the other, and I preferably make the flange 25 oblong in shape, as shown in Fig. 4. The wires constituting the spirals 3 and 4 in order to pass this casting or tap must be bent to one side, and it will be observed that the oblong flange 25 is placed transversely of the pipe so as to cover the space from which the wires have been bent. In other words, this flange covers and thus protects and strengthens that portion of the conduit in which there are no strengthening spiral wires. This casting 23 may be made solid when placed in position in the pipe, and the passageway 26 may be subsequently bored and provided with screw threads in order to receive the pipe which leads the gas or liquid to the place of use, or I may originally thread the casting or tap, and close the opening by a screw-threaded plug 27, the upper end of which has a slot 28 or other means adapting it to be engaged by a tool, for the purpose of turning it, and it will normally be screwed into position with its outer surface flush with or below the outer surface of the pipe.

Since my conduit is made of material which is more or less porous, I have found that it is advisable to coat the interior with a waterproof material in order to insure against leakage of the liquids or gases contained in it. The material which I use is asphalt, coal tar, or similar material, and it is applied in heated condition. The surfaces to be covered are first sprayed or painted with a thin solution of the coating material preferably made by dissolving asphalt in naphtha, benzin or a similar solvent, so that the coating will impregnate to a slight depth the surface of the concrete. A heavier coating of asphalt or similar material is then applied in heated condition, and its adhesion to the surface will be insured by the thin coating above mentioned. While asphalt and coal tar are probably the most desirable coatings to be used for conveying water or gas, my invention is not confined to their use, since I may employ other materials of a like nature adapted to withstand the destructive action of the particular liquid or gas which is conveyed. In any case the material constitutes a gas or water tight coating which prevents leakage.

Having thus described the invention, what is claimed is:

1. A pipe having embedded within its wall a reinforcing cage composed of outer and inner separated metal spirals, the turns of which are parallel but staggered longitudinally of the pipe, and longitudinal wire lacings at intervals around the cage connecting the turns of the outer spiral with the adjacent turns of the inner spiral.

2. A pipe having embedded within its walls a reinforcing cage composed of outer and inner separated metal spirals the turns of which are parallel but staggered longitudinally of the pipe, and longitudinal wires secured to the cage at the ends and connecting the successive turns of the two spirals, thus lacing them together.

3. A concrete or cement mortar pipe having a reinforcing cage embedded within its walls composed of inner and outer separated wire spirals, longitudinal rods anchored in the concrete walls and secured to the outer spiral, and longitudinal wire lacings passing alternately about the successive turns of the two spirals and fastening the spirals together.

4. A concrete or cement mortar pipe having a reinforcing cage embedded within its walls composed of inner and outer separated wire spirals, longitudinal rods secured to the outer spiral and having their ends doubled back and adjacent to the inner spiral, and longitudinal wire lacings connecting the successive turns of the two spirals and fastening the spirals together at intervals.

5. A concrete or cement mortar pipe having a reinforcing cage embedded within its walls composed of inner and outer separated wire spirals the turns of which are parallel but staggered longitudinally of the pipe, longitudinal rods anchored in the concrete walls and secured to the outer spiral, and longitudinal wire lacings passing alternately about and connecting the successive turns of the two spirals and fastening the spirals together.

6. A reinforcing member for a concrete or cement mortar pipe comprising an outer metal spiral, a second metal spiral of less diameter arranged within the outer spiral, the coils of one spiral being parallel and in staggered relation to the coils of the other spiral, and longitudinal wire lacings arranged at intervals about the reinforcing member, each lacing connecting each coil of the inner spiral with the adjacent coils of the outer spiral.

7. A reinforcing member for a concrete or cement mortar pipe comprising an outer metal spiral, a second metal spiral of less diameter arranged within the outer spiral, the coils of one spiral being parallel and in staggered relation to the coils of the other spiral, longitudinal wire lacings arranged at intervals about the reinforcing member, each lacing connecting each coil of the inner spiral with the adjacent coils of the outer spiral, and longitudinally arranged metal rods distributed around the outer spiral and connected at intervals thereto.

8. A reinforcing member for a concrete or cement mortar pipe comprising an outer metal spiral, a second metal spiral of less diameter arranged within the outer spiral, the coils of one spiral being parallel and in staggered relation to the coils of the other spiral, longitudinal wire lacings arranged at intervals about the reinforcing member, each lacing connecting each coil of the inner spiral with the adjacent coils of the outer spiral, and longitudinally arranged metal rods distributed around the outer spiral and connected at intervals thereto, said rods having inwardly turned ends lying adjacent to the coils of the inner spiral and adapted to center the inner spiral with respect to the outer spiral.

9. The combination with a concrete or cement mortar pipe, of a steel reinforcing cage embedded in said pipe embodying longitudinal and transverse wires secured together, a metal casting extending through the wall of said pipe having outer and inner flanges flush with the outer and inner faces of the pipe, one of said flanges being elongated transversely of the pipe to prevent turning and to serve as a strengthening means for the pipe.

10. The combination with a concrete or cement mortar pipe, of a steel reinforcing cage embedded in said pipe embodying a series of longitudinal rods secured to a spiral, of a metal casting extending through the wall of said pipe the turns of the spiral being so bent as to pass by the sides of said casting, and flanges on said casting flush with the inner and outer faces of said pipe, one of said flanges being elongated to cover that portion of the pipe from which the spiral has been bent.

11. A reinforced concrete or cement mortar pipe having a cage embedded within its walls composed of inner and outer separated steel wire spirals, longitudinal steel rods secured to the outer spiral having their ends bent back between the two spirals so as to lie parallel to and against the inner spiral, and longitudinal wire lacing passing alternately outside of the successive turns of the two spirals to fasten the spirals together.

In testimony whereof I affix my signature in presence of two witnesses.

MASON DELANO PRATT.

Witnesses:
GRACE M. HARCLERODE,
ISAAC N. LEEDS, Jr.